United States Patent [19]
Hazenfield

[11] Patent Number: 5,920,616
[45] Date of Patent: *Jul. 6, 1999

[54] ON-HOLD MESSAGING SYSTEM AND METHOD

[76] Inventor: Joey C. Hazenfield, 2677 Little Dry Run Rd., Cincinnati, Ohio 45244

[*] Notice: This patent is subject to a terminal disclaimer.

[21] Appl. No.: 08/893,296

[22] Filed: Jul. 15, 1997

Related U.S. Application Data

[62] Division of application No. 07/999,592, Dec. 31, 1992, abandoned.

[51] Int. Cl.⁶ .................................................... H04M 1/00
[52] U.S. Cl. ........................................ 379/162; 379/90.01
[58] Field of Search ................................. 379/67, 88, 89, 379/201, 67.1, 88.07, 88.16, 88.22, 88.25, 88.28; 369/275.1, 275.2, 275.3

[56] References Cited

U.S. PATENT DOCUMENTS

| | | | |
|---|---|---|---|
| 3,733,442 | 5/1973 | Lee | 379/162 |
| 3,794,774 | 2/1974 | Kemmerly et al. | 379/162 |
| 4,429,187 | 1/1984 | Butcher | 379/162 |
| 4,588,865 | 5/1986 | Hestad | 379/162 |
| 4,636,880 | 1/1987 | Debell | 360/72.3 |
| 4,656,660 | 4/1987 | Nishimura et al. | 379/162 |
| 4,860,338 | 8/1989 | Waldman | 379/72 |
| 4,891,835 | 1/1990 | Leung et al. | 379/73 |
| 5,003,587 | 3/1991 | Forbes | 379/162 |
| 5,091,635 | 2/1992 | Akatsuka et al. | 369/275.3 |
| 5,095,504 | 3/1992 | Nishikawa et al. | 379/162 |
| 5,131,031 | 7/1992 | Waldman | 379/162 |
| 5,148,418 | 9/1992 | Tsurushima | 369/32 |
| 5,218,590 | 6/1993 | Miyasaka | 369/54 |
| 5,321,740 | 6/1994 | Gregorek et al. | 379/67 |
| 5,552,896 | 9/1996 | Yoshida | 358/342 |

OTHER PUBLICATIONS

Yamaha YPDR–Professional Disc Recorder YPDR601/RC601—Operating Manual (Yamaha Corporation).

*Primary Examiner*—Scott L. Weaver
*Attorney, Agent, or Firm*—Roylance, Abrams, Berdo & Goodman, LLP

[57] ABSTRACT

An on-hold messaging system is provided for use with a business telephone system having an on-hold audio input. The system includes an optical disc having one or more messages recorded thereon, an optical disc player having an audio output, and a connection or interface between the audio output of the optical disc player and the on-hold input of the business telephone system. The optical disc player is enabled to continuously play the message or messages through the business telephone system, so that at least a portion of a message can be heard by an outside party when a telephone call between the outside party and a user of the business telephone system has been completed and the outside party is placed on hold by a user of the business telephone system. Optionally, an audio amplifier may be used as an interface between the optical disc player and the on-hold input of the business telephone system, so that the sound quality of the message as heard by the outside party is satisfactory. The optical disc preferably comprises a table of contents defining a plurality of tracks on the disc for containing messages, with the table of contents having been recorded on the disc before any messages were recorded thereon. This allows different messages to be recorded onto the optical disc during separate recording operations, so that the capacity of the on-hold messaging system can be changed without having to re-record old messages as in prior endless-loop tape systems. Methods for on-hold messaging, and methods for servicing on-hold messaging systems by recording new messages onto previously-recorded optical discs, are also disclosed.

23 Claims, 1 Drawing Sheet

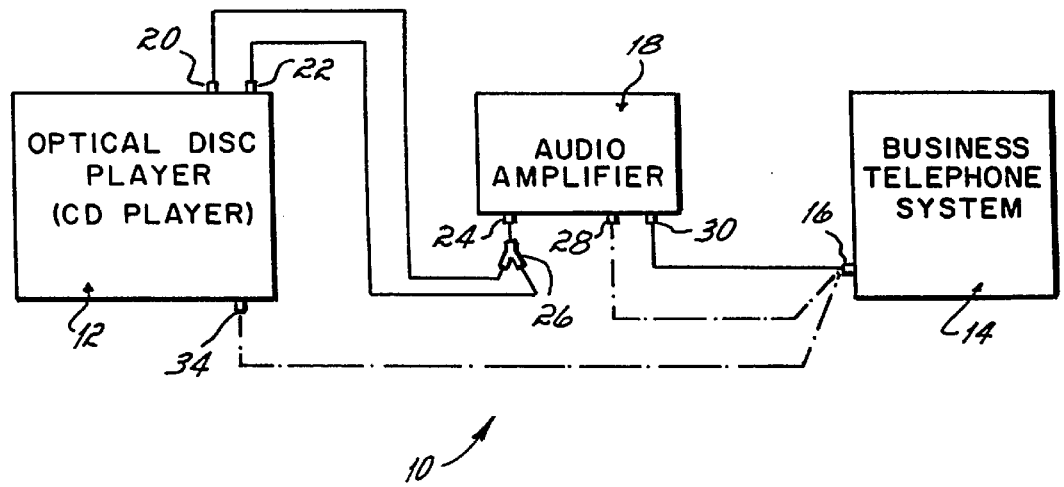

ON-HOLD MESSAGING SYSTEM AND METHOD

This is a division of application Ser. No. 07/999,592 filed Dec. 31, 1992, now abandoned.

FIELD OF THE INVENTION

The present invention relates to on-hold messaging for telephone systems, and particularly, for business telephone systems.

BACKGROUND OF THE INVENTION

When a business receives telephone calls, the caller is often put on hold awaiting further disposition. Before on-hold messaging was developed, callers were forced to listen to silence while they were on hold. Callers often got bored or frustrated if they were kept on hold for any length of time, sometimes to the point of hanging up. On-hold messaging systems were developed, at least in part, to solve this problem. With such systems, pre-recorded messages are played as the caller remains on hold. These messages have been in the form of music for the caller's listening pleasure and in the form of advertisements to provide the caller with information about the business. Because of the popularity of on-hold messaging, most business telephone systems available today have been designed to include on-hold messaging capabilities. These business telephone systems often include an on-hold input jack, usually referred to as a music on-hold (MOH) port. Previously, the audio output of a magnetic audio tape player was connected directly to the on-hold input jack. Typically, the messages were recorded onto endless loop cassette tapes. Once connected in this manner to the telephone system, the tape player is turned on and the endless loop cassette tape is played continuously. When a caller is put on hold, the tape player's audio output is connected to the caller's telephone receiver so that the caller hears the on-hold message or messages (i.e., music and/or advertisements). There are a number of problems associated with such on-hold messaging systems.

When used for on-hold messaging purposes, endless loop audio cassette tapes and the tape decks used to play them are prone to malfunctioning, usually from various types of mechanical failure. Such mechanical failures result in the on-hold messaging system being non-functional until the tape and/or the deck can be replaced or repaired. These tapes and decks are relatively expensive to replace or repair. The endless loop cassette tapes are typically played continuously for extended periods of time. The tapes are known to stretch, break, or just wear out and are generally replaced every 90 days before failure occurs. Being played so much, the tape decks are known to break down after a relatively short service life. Usually, the motors of the tape decks burn out. The decks typically have a life span without repair or replacement of only about six months. In addition, the tape decks were not always compatible with a given business telephone system, even when that telephone system had on-hold messaging capabilities. This incompatibility usually resulted in the sound quality (i.e., volume level and/or clarity) to be unacceptably poor.

From time to time, a business may want to vary the message being played, for example, playing seasonal music only during a particular season (e.g., Christmas music) and tailoring advertisements to a particular season's demands. For instance, a business may wish to advertise lawn mowers during the spring and summer and snow plows during winter. In addition, the business may no longer wish to play one of the messages (e.g., an advertisement on a discontinued product line) or may wish to change only a portion of one of the messages (e.g., change the brand name of the product being advertised). With prior on-hold messaging systems, businesses were limited in their ability to have such changes made to their on-hold messages.

While multiple messages can be recorded onto the endless loop cassette tape, all the messages are heard continuously with each message only being heard in the sequence in which it was recorded. In addition, the entire endless loop cassette tape is normally filled with messages (i.e., music, advertisements, etc.) in order to avoid periods of silence. Previously, in order to service the on-hold messaging needs of a business (i.e., to change the on-hold message(s)), a new tape was recorded containing the desired new and old messages. The tape recording process is costly. This cost escalates when messages which do not need changing have to be re-recorded.

Therefore, there is a need for a more versatile and reliable on-hold messaging system, which makes it easier and less expensive to service the on-hold messaging requirements of a business.

SUMMARY OF THE INVENTION

The present invention is directed to a more versatile and reliable on-hold messaging system. With the present on-hold messaging system, particular messages can be selectively played in whatever order desired and on a continuous basis. In addition, on-hold messaging systems according to this invention are less likely to break down or otherwise stop functioning.

The present invention is also directed to an on-hold messaging system which can be more easily and less expensively serviced to satisfy the on-hold messaging requirements of a business. With the present on-hold messaging system, new messages can be added and old messages replaced without having to re-record messages which do not need changing.

The on-hold messaging system according to the present invention uses an optical disc, preferably a compact disc or CD, as the recording medium for the messages instead of endless loop cassette tapes. The present system includes an optical disc player or deck connected to a telephone system having on-hold messaging capabilities. An audio amplifier may be necessary as an interface between the optical disc player and the on-hold input of the telephone system so that the sound quality (i.e., volume level and clarity) of the message(s) heard by a caller is satisfactory. The sound quality of the on-hold messages produced by previous on-hold messaging systems was inconsistent. This inconsistent sound quality was due, at least in part, to incompatibility between the audio output of the tape player and the on-hold input of the business telephone system. Thus, the audio amplifier is used to match the audio output of the optical disc player to the on-hold input of the telephone system. The type of audio amplifier used depends upon the on-hold input of the particular telephone system.

With an output from the optical disc player connected to the on-hold input of the telephone system, an optical disc having at least one message recorded thereon is played in the optical disc player so that a caller hears the message after being placed on hold. The optical disc can be played continuously with the messages being accessed only when a caller is placed on hold. In order to increase the life span of the optical disc player, a timer can be used to turn the disc player on and off for desired periods of time. Even if played 24 hours a day, optical disc players have been found to have a life span without the need for replacement or repair far longer than the cassette tape players used in prior on-hold messaging systems (i.e., upwards of about four years compared to about six months). If a timer is used to turn the disc player on and off automatically, the play button will have to be re-set unless the particular disc player used is capable of automatically playing the optical disc after being turned off and then turned on.

Broadly, a method of servicing such an on-hold messaging system according to the present invention includes the steps of providing at least one optical disc with at least one message for being played in an on-hold messaging system. The capacity of the on-hold messaging system is changed (i.e., the number of messages that can be played is increased) by recording at least one more message onto the optical disc. This multiple recorded optical disc is then provided for being played on the on-hold messaging system. This method allows additional messages to be added without having to re-record messages that don't need changing.

A more particular method of servicing the present on-hold messaging system includes the steps of producing at least a first and a second optical disc with each of the optical discs containing the same message. At least the first optical disc is then provided for being played in the on-hold messaging system. Next, at least one more message is recorded onto the second optical disc. Finally, the second optical disc, having the one or more messages recorded thereon, is provided for being played in the on-hold messaging system. Preferably, the additional message or messages are also recorded onto the first optical disc. If it becomes desirable to add more messages to the on-hold messaging system, the additional message or messages can be recorded onto the first optical disc which is then used to replace the second optical disc. The new message or messages can then be recorded onto the second optical disc, and the above process repeated each time new messages are to be added. Thus, the present invention enables a library of on-hold messages to be built and accessed as desired. In prior on-hold messaging system, changes to any of the messages required the prior taped messages to be reproduced along with any new messages.

The above and other objectives, features, and advantages of the present invention will become apparent upon consideration of the detailed description and appended drawings.

BRIEF DESCRIPTION OF THE DRAWINGS

The FIGURE is a block diagram of a preferred on-hold messaging system according to the present invention.

DETAILED DESCRIPTION OF THE INVENTION

Referring to the FIGURE, an on-hold messaging system 10 according to the present invention includes an optical disc player 12, preferably a compact disc player, connected to a business telephone system 14 having on-hold messaging capabilities. Most business telephone systems 14 available today are typically provided with an on-hold input jack 16, typically an RCA phono jack. The compact disc player 12 is connected to the on-hold input jack 16 with standard shielded audio cable. In order to insure the sound quality (i.e., volume level and clarity) of the messages being played, as heard by a caller, it may be necessary to interconnect an audio amplifier 18, preferably having volume level control, between the compact disc player 12 and the business telephone system 14.

A specific embodiment of the present on-hold messaging system 10 utilizes a standard, off the shelf compact disc player 12 manufactured by Sony Corporation, Model No. CDP-297, and a 1-watt audio amplifier 18 manufactured by University Sound Inc., Sylmar, Calif., Model No. 1701. The Sony compact disc player 12 can be programmed to play any number of tracks on a compact disc (not shown) in whatever sequence desired. The Sony compact disc player 12 can also be programmed to continuously repeat the same group of tracks in the order selected. This Sony compact disc player 12 has a left line out 20 and a right line out 22 (phono jacks), each of which has an output level of 2 volts (at 50 kilohms) and a load impedance over 10 kilohms. The University Sound audio amplifier 18 has a single auxiliary input 24 having 47 kilohms impedance and 50 millivolts sensitivity. Both output lines 20, 22 of the Sony compact disc player 12 are connected to the input jack 24 on the University Sound audio amplifier 18 through a standard Y-connector 26 using standard shielded audio cable. The University Sound audio amplifier 18 also has two outputs: an 8 ohm, 1 watt output 28 and a 500 ohm, 3 milliwatt output 30.

Many of the business telephone systems 14 having on-hold messaging capabilities utilize on-hold inputs 16 rated at either 600 ohms or 8 ohms. One such telephone system is the Merlin System, Model. No. 1030, manufactured by AT&T. This system has a Services Module (i.e., a printed circuit board) which is plugged into position no. 6 in order to provide the telephone system with on-hold messaging capabilities. The on-hold input jack 16 of this system is rated at 8 ohms. Therefore, this University Sound audio amplifier 18 is compatible with either type of business telephone system 14. Standard shielded audio cables are used to connect the applicable audio amplifier output 28, 30 to the on-hold input 16 of the business telephone system 14. For the purpose of illustration only, the cable connecting the 8 ohm audio amplifier output 28 to the on-hold input 16 is shown in phantom.

The Sony compact disc player 12 also has a headphone output 34 (i.e., stereo phone jack) rated at a maximum output level of 10 milliwatts and a load impedance of 32 ohms. It has been found that for some business telephone systems 14 having on-hold messaging capabilities, the sound quality of the message played to a caller is better when the headphone output 34 of the compact disc player 12 is used instead of either phono jack 20, 22. When applicable, the headphone output 34 is connected directly to the on-hold input 16 of the business telephone system 14 using standard shielded audio cable (shown in phantom). For example, the NEC America, Inc., Melville, N.Y., Electra Mark II series telephone system has such an on-hold input. With this telephone system, a separate printed circuit board, specified as the TSW-E card, provides the phone system with on-hold messaging capabilities.

The preferred optical disc used in the on-hold messaging system of this invention is typically referred to as a compact disc or CD (not shown). Satisfactory results have been obtained using such optical discs manufactured by Yamaha, Part No. YOD 063. Before messages are recorded onto the CD, spaced apart track marks are burned into the optical disc at pre-determined distances to form multiple beds or tracks of desired length (i.e., writing a table of contents). The term "message" herein refers to music, advertisements or any other type of recordable audio data a business might play on an on-hold messaging system. The table of contents is written before any audio data has been recorded. Preferably, the track marks are spaced apart to form beds having 30 second lengths. Thirty second lengths have been found to be compatible with the on-hold messaging requirements of most businesses.

Once the table of contents is written, the desired number of messages is recorded onto the necessary number of beds on the optical disc. Typically, each bed has one message recorded thereon with the beginning of the message fading in at the beginning of the bed, and the end of the message fading out at the end of the bed. Two or more messages can also be recorded as a cluster. That is, instead of each message fading in and out, two or more messages can be grouped together to play in a continual fashion. With a cluster, the messages are separated only by the track marks. The track marks are typically so narrow that, when played in series, the messages in a cluster are usually perceived to be continuous. A professional optical disc recorder (not shown) manufactured by Yamaha, Model No. YPDR601/RC601 was used to not only write the table of contents, but also to record the desired message(s). To record these messages onto the optical disc, the messages are preferably first recorded from a professional sound studio recording system onto a digital audio tape or DAT. The messages are recorded by connecting the digital output of a DAT deck or player (not shown) to the digital input of the audio disc recorder. Next, the digital audio tape is played in the DAT deck while the optical disc recorder is in the recording mode. Acceptable results have been obtained using a professional audio tape deck manufactured by Panasonic, one location in Secaucus, N.J., Model No. SV-3700, with DT-120P digital audio tapes manufactured by Sony Corporation. The above recording method helps to obtain more consistent sound quality and clearer message delivery than that typically found in prior on-hold messaging systems.

A method has been developed for servicing the on-hold messaging requirements of a business using the on-hold messaging system 10 of this invention. In the preferred embodiment of this method, a servicing entity produces at least a first and a second optical disc, in the manner described above, with each of the optical discs containing the same message or messages. The first optical disc is then provided to the business for being played in its on-hold messaging system. The second optical disc is then retained by the servicing entity. If the on-hold messaging requirements of the business change (e.g., the need for an additional message), the additional message or messages are recorded onto the second optical disc. The second optical disc is then provided to the business to replace the first optical disc for being played in the on-hold messaging system. The first optical disc is then returned to the servicing entity and the additional message or messages are recorded onto the first optical disc. If the on-hold messaging requirements change again, the new message is recorded onto the first optical disc which is then used to replace the second optical disc. This new message is then recorded onto the second optical disc. This process repeats itself as many times as necessary in order to satisfy the on-hold messaging requirements of the business.

From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

What is claimed is:

1. A method of servicing an on-hold messaging system used with a business telephone system having an on-hold input, said on-hold messaging system including an optical disc player having an audio output coupled to the on-hold input of said business telephone system, said method of servicing comprising the steps of:

providing at least one optical disc with at least one message having been recorded thereon for continuous playing in the optical disc player of said on-hold messaging system, so that at least a portion of said at least one message can be heard by an outside party when a telephone call between said outside party and a user of said business telephone system has been completed and said outside party is placed on hold by a user of said business telephone system;

recording at least one more message onto said at least one optical disc to produce at least one multiple-recorded optical disc; and providing said at least one multiple-recorded optical disc for continuous playing in the optical disc player of said on-hold messaging system, so that at least a portion of said at least one message or of said at least one more message can be heard by an outside party when a telephone call between said outside party and a user of said business telephone system has been completed and said outside party is placed on hold by a user of said business telephone system.

2. The method of claim 1 wherein spaced-apart track marks are burned into said at least one optical disc at predetermined distances to form multiple beds of desired length, before said at least one message is recorded on said at least one optical disc.

3. The method of claim 2 wherein each of said beds is about 30 seconds in length.

4. The method of claim 2 wherein at least one of said beds is left without a message recorded thereon after said at least one message is recorded onto said at least one optical disc.

5. The method of claim 2 wherein said beds are all of the same length.

6. The method of claim 2 wherein at least two of said beds contain different portions of the same message.

7. A method of servicing an on-hold messaging system used with a business telephone system having an on-hold input, said on-hold messaging system including an optical disc player having an audio output coupled to the on-hold input of said business telephone system, said method of servicing comprising the steps of:

producing at least a first and a second optical disc with each of said optical discs containing the same at least one message;

providing at least said first optical disc for continuous playing in the optical disc player of the on-hold messaging system, so that at least a portion of said at least one message can be heard by an outside party when a telephone call between said outside party and a user of said business telephone system has been completed and said outside party is placed on hold by a user of said business telephone system;

recording at least one more message onto at least said second optical disc; and providing at least said second optical disc for continuous playing in the optical disc player of the on-hold messaging system, so that at least a portion of said at least one message or of said at least one more message can be heard by an outside party when a telephone call between said outside party and a user of said business telephone system has been completed and said outside party is placed on hold by a user of said business telephone system.

8. The method of claim 7 wherein said at least one more message is recorded onto said first optical disc after said at least one more message is recorded onto at least said second optical disc.

9. The method of claim 7 wherein spaced-apart track marks are burned into each of said optical discs at predetermined distances to form multiple beds of desired length, before said same at least one message is recorded thereon.

10. The method of claim 9 wherein each of said beds is about 30 seconds in length.

11. The method of claim 9 wherein at least one of said beds is left without a message recorded thereon after said same at least one message is recorded onto each of said optical discs.

12. The method of claim 9 wherein said beds are all of the same length.

13. The method of claim 9 wherein at least two of said beds contain different portions of the same message.

14. A method of servicing an on-hold messaging system used with a business telephone system having an on-hold input, said on-hold messaging system including a playback device having an audio output coupled to the on-hold input of said business telephone system, said method of servicing comprising the steps of:

providing a recording medium with a first message recorded thereon for continuous playing in the playback device of the on-hold messaging system, so that at least a portion of said first message can be heard by an outside party when a telephone call between said outside party and a user of said business telephone system has been completed and said outside party is placed on hold by a user of said business telephone system;

recording a second message onto said recording medium or onto a duplicate of said recording medium to produce a modified recording medium; and providing said modified recording medium for continuous playing in the playback device of the on-hold messaging system, so that at least a portion of said second message can be heard by an outside party when a telephone call between said outside party and a user of said business telephone system has been completed and said outside party is placed on hold by a user of said business telephone system.

15. The method of claim 14 wherein multiple beds are formed in said recording medium for containing messages, before said first message is recorded thereon.

16. The method of claim 15 wherein each of said beds is about 30 seconds in length.

17. The method of claim 15 wherein at least one of said beds is left without a message recorded thereon after said first message is recorded onto said recording medium.

18. The method of claim 15 wherein at least two of said beds contain different portions of the same message.

19. The method of claim 15 wherein said beds are all of the same length.

20. The method of claim 14 wherein said recording medium and said modified recording medium each comprise an optical disc.

21. The method of claim 14 wherein said recording medium and said modified recording medium each comprise a non-magnetic recording medium.

22. The method of claim 14 wherein said modified recording medium has said first message and said second message recorded thereon, so that when said modified recording medium is provided for playing in the playback device of the on-hold messaging system, at least a portion of said first message or of said second message can be heard by an outside party when a telephone call between said outside party and a user of said business telephone system has been completed and said outside party is placed on hold by a user of said business telephone system.

23. The method of claim 14 wherein said first message is retained on said recording medium or on said duplicate of said recording medium while said second message is recorded thereon, so that when said modified recording medium is provided for playing in the playback device of the on-hold messaging system, at least a portion of said first message or of said second message can be heard by an outside party when a telephone call between said outside party and a user of said business telephone system has been completed and said outside party is placed on hold by a user of said business telephone system.

* * * * *